United States Patent [19]
Oosterling et al.

[11] 3,979,072
[45] Sept. 7, 1976

[54] DEVICE FOR SPREADING DISTRIBUTABLE MATERIAL COMPRISING A RECIPROCATORILY SWINGING PIPE-SHAPED DISTRIBUTOR

[75] Inventors: Pieter Adriaan Oosterling, Nieuw-Vennep; Johannes Phillippus Hooftman, Hoofddorp, both of Netherlands

[73] Assignee: H. Vissers B.V., Nieuw Vennep, Netherlands

[22] Filed: Nov. 6, 1974

[21] Appl. No.: 521,474

[30] Foreign Application Priority Data
Nov. 8, 1973   Netherlands ........................ 7315342

[52] U.S. Cl. .............................. 239/689; 239/591
[51] Int. Cl.² .......................................... A01C 3/06
[58] Field of Search ................... 239/688, 689, 591

[56] References Cited
UNITED STATES PATENTS

| | | | |
|---|---|---|---|
| 2,508,874 | 5/1950 | Turnbull | 239/591 X |
| 3,111,179 | 11/1963 | Albers et al. | 239/591 |
| 3,861,600 | 1/1975 | Osterling et al. | 239/689 |

FOREIGN PATENTS OR APPLICATIONS

| | | | |
|---|---|---|---|
| 33,512 | 4/1964 | Finland | 239/689 |

Primary Examiner—John J. Love
Attorney, Agent, or Firm—John P. Snyder

[57] ABSTRACT

The invention relates to a device for spreading distributable material, for example, fertilizer, comprising a hopper for the material having a delivery port and a reciprocatorily, swinging pipe-shaped distributor joining said delivery port, more particularly a fertilizer distributor pipe; in practice it has been found that the inner wall of the pipe of a device of the kind set forth is subject to heavy wear due to the heavy frictional forces between the material to be distributed and the inner wall; the invention has for its object to provide a more wear-resistant pipe and provides for this purpose a device comprising a distributor pipe adapted to swing to and fro, in which the inner wall of the pipe is coated with a wear-resistant layer within a region extending from the outlet end to the substantially upright wall portions.

10 Claims, 7 Drawing Figures

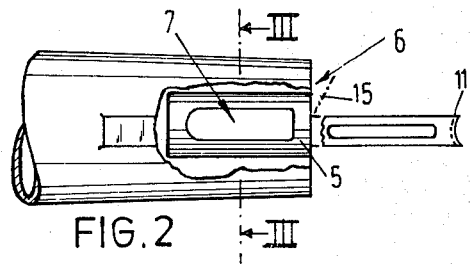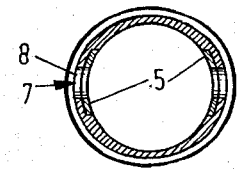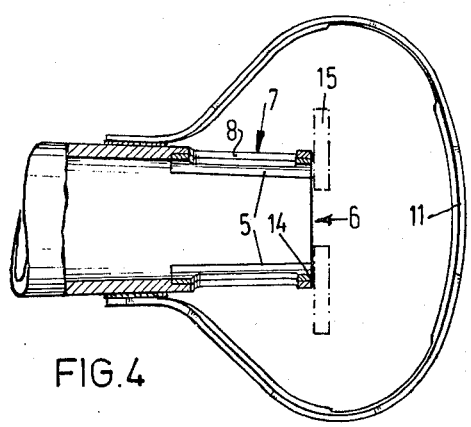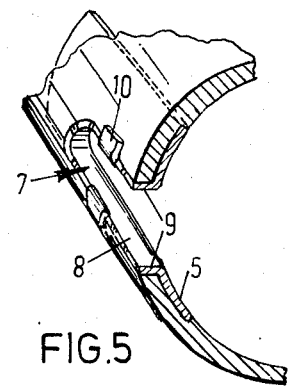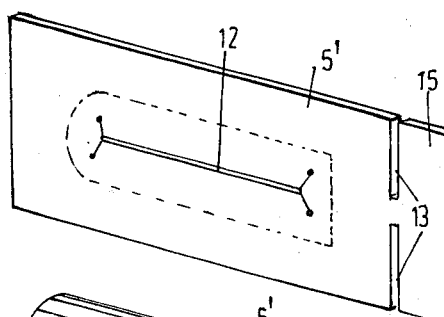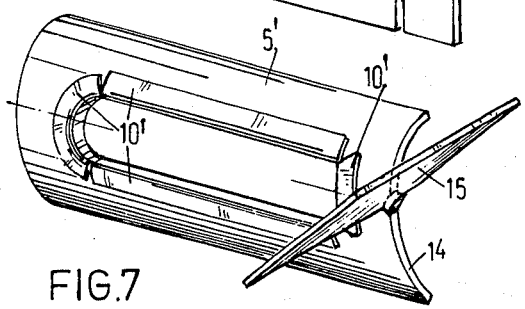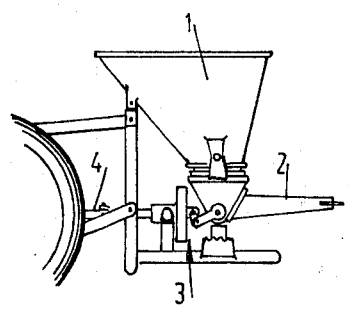

DEVICE FOR SPREADING DISTRIBUTABLE MATERIAL COMPRISING A RECIPROCATORILY SWINGING PIPE-SHAPED DISTRIBUTOR

The invention relates to a device for spreading distributable material, for example, fertilizer, comprising a hopper for the material having a delivery port and a reciprocatorily swinging pipe-shaped distributor joining said delivery port, more particularly a fertilizer distributor pipe.

In practice it has been found that the inner wall of the pipe of a device of the kind set forth is subject to heavy wear due to the heavy frictional forces between the material to be distributed and the inner wall. These heavy frictional forces are produced particularly near the outlet end of the pipe because at this place the accelerating forces exerted on the particles of the material required for spreading the particles over a large area are at a maximum.

The invention has for its object to provide a more wear-resistant pipe.

For this purpose the invention provides a device comprising a distributor pipe adapted to swing to and fro, in which the inner wall of the pipe is coated with a wear-resistant layer within a region extending from the outlet end to the substantially upright wall portions.

Said layer may be formed by adding to the basic material of the pipe wall elements capable of producing a wear-resistant surface layer on the inner wall. Alternatively, the wear-resistant layer may be obtained by spraying wear-resistant material onto the inner wall.

In a preferred embodiment of the invention the wear-resistant layer consists of a metal plate, which may be countersunk into the basis material of the pipe. In this way a smooth inner wall is obtained, which is conducive to the spreading effect.

In a further embodiment of the invention the rim of the plate serving as a wear-resistant layer located near the outlet end of the pipe may have secured to it at least one deflecting plate. This deflecting plate serves for imparting to a portion of the material to be distributed from the pipe a direction differing from the horizontal so that the distribution pattern is affected.

A few embodiments of the invention will not be described more fully with reference to a drawing in which:

FIG. 1 is a side elevation of a device comprising a reciprocatorily swinging distributing pipe in accordance with the invention.

FIG. 2 is a detailed view of the outlet end of the distributor pipe in a side elevation, some parts being partly broken away.

FIG. 3 is a sectional view taken on the line III-III in FIG. 2,

FIG. 4 is a plan view of the outlet end of the distributor pipe shown in FIG. 2, FIG. 5 is a sectional view and a perspective view of part of the distributor pipe near its outlet end.

FIG. 6 is a perspective view of a metal plate serving as a wear-resistant layer prior to being mounted in the distributor pipe.

FIG. 7 shows the same metal plate after being mounted in the distributor pipe.

The spreading device shown in FIG. 1 comprises a hopper 1 for the material to be spread, having a delivery port in its bottom. This port communicates with a distributor pipe 2 adapted to swing to and fro by means of a crank mechanism 3, which is driven by a driving shaft 4, for example, the power take-off shaft of an agricultural tractor.

The distributor pipe 2 is preferably made of a synthetic resin, since this material has a low specific weight so that the pipe can be of a light-weight structure. Owing to this light-weight structure the reciprocatory movement can be performed with a high frequency so that a large spreading width can be obtained. Owing to this high frequency the acceleration forces exerted on the particles of the material to be spread will be heavy, which results in a heavy wear of the inner wall of the distributor pipe 2. Since the particles will mainly move along the upright wall portions, that is to say, those parts of the wall which are substantially normal to the reciprocatory motion of the distributor pipe, the greatest wear will be produced at said area and the more so, the closer the particles approach the outlet end of the pipe because in this area the acceleration forces are at a maximum.

FIGS. 2, 3, 4 and 5 show a wear-resistant layer 5 extending from the outlet end across the substantially upright wall portions. It will be obvious that the wear-resistant layer may cover the whole inner wall of the pipe, dependent upon the degree of wear-resistance of the basic material of the pipe 2.

Said figures show that the wear-resistant layer 5 is countersunk in the basic material of the pipe so that a smooth inner wall of the pipe is obtained, the distribution effect, therefore, not being adversely affected thereby. According to the invention the wear-resistant layer preferably consists of a metal plate, which may be stuck in the basic material material during the formation of the distributor pipe of synthetic resin.

When the distributor pipe 2 is provided near its outlet end 6 with apertures 7 in the upright wall portions, the metal plate 7 may have corresponding apertures.

Although the aperture 7 need not be provided with a wear-resistant layer at its edge 8, it may be advantageous for certain materials to protect this edge. In a preferred embodiment of the invention the wear-resistant plate 5 may be provided at the edge of its opening corresponding with the aperture 7 with a flange 9 projecting from the plate 5 (see FIG. 5).

The flange 9 may be provided with fastening tags 10, at least two of which are provided in relatively opposite positions with respect to the aperture 7. When such a fastening tag 10 is provided, there is no need for mounting the wear-resistant metal plate 5 simultaneously with the formation of the distributor pipe 2: it may be arranged afterwards in a depression previously provided in the inner wall of the distributor pipe, the tags 10 aligned to the flange 9 being subsequently bent over outwardly.

It is known to provide a bracket 11 around the outlet end 6 of the distributor pipe 2 for affecting the distribution pattern of the material to be spread. It will be obvious that during the ejection a portion of the material strikes the bracket 11 and changes its direction of movement.

FIGS. 6 and 7 show a wear-resistant metal plate in its form previous to mounting in the distributor pipe 2 and after it is mounted in the pipe 2 respectively. The wear-resistant plate 5' may have a longitudinal cut 12 and two aligned cuts 13 near the end of the plate 5'. The cut 12 serves to force a hole in the distributor pipe 2 during the mounting operation of the plate 5' to correspond with the aperture 7 in the upright sidewall of the distributor pipe. At the same time the portion of the bent-over material of the plate 5' projecting from the pipe can be bent further against the outer wall of the pipe so that a connecting tag 10 is obtained, the function of which corresponds with that of the connecting tags 10 of FIG. 5.

Part of the function of the bracket 11 may be taken over by at least one target plate provided at the edge 14 of the plate 5 or 5' near the outlet end of the distributor pipe 2. A single target plate 15 at the edge 14 of the wear-resistant plate 5' (see FIG. 7) may be formed from the plate shown in FIG. 6. The aligned cuts 13 divide the plate into a wear-resistant plate 5' and a target plate 15. After the wear-resistant plate 5' is mounted in the inner wall of the distributor pipe 2, the portion 15 can be turned into the desired position so that the edge 14 has one target plate.

Within the scope of the invention the wear-resistant plate 5 or 5' may, of course, have a different shape, the aperture 7 may be shaped in a different form and the target plate 15 may be in a different position than that shown, whilst a plurality of target plates 15 may be fastened to the edge 14, for example, by welding.

What is claimed is:

1. A device for spreading distributable material, for example fertilizer, comprising a hopper containing said material having a delivery port and a reciprocatorily swinging distributor pipe of synthetic resinous material communicating with said delivery port, more particularly a fertilizer distributor pipe, said distributor pipe having one end communicating with said delivery port and an opposite outlet end which whips horizontally back and forth to fling material over a wide swath, and a pair of wear-resistant layers on the inner surface of said distributor pipe at said outlet end thereof, each layer extending over a region beginning at a boundary spaced between said ends of the distributor pipe, extending therefrom to said outlet end and covering only the substantially upright portions of said inner surface.

2. A device as claimed in claim 1 characterized in that said layers are formed by metal plates.

3. A device as claimed in claims 1 and 2 characterized in that said plates are countersunk in the basic material of the distributor pipe.

4. A device as claimed in claim 3, in which the distributor pipe has near its end at least one aperture provided in the upright wall portion, characterized in that one metal plate has an opening registering with the aperture of the pipe.

5. A device as claimed in claim 4 characterized in that the edge of each opening is provided with a wear-resistant layer.

6. A device as claimed in claim 5 characterized in that the wear-resistant layer on the edge of the openings is formed by a flange fastened to the edge of the opening of the wear-resistant metal plate.

7. A device as claimed in claim 6 characterized in that said flange is provided with fastening tags at least at two opposite areas with respect to the opening.

8. A device for spreading distributable material, for example fertilizer, comprising a hopper containing said material having a delivery port and a reciprocatorily swinging distributor pipe communicating with said delivery port, more particularly a fertilizer distributor pipe, characterized in that over a region extending from the outlet end across the substantially upright wall portions the inner wall of the pipe is covered with a wear-resistant layer, and at least one target plate fastened to the edge of the wear-resistant plate near the outlet of the distributor pipe.

9. In a material spreading device including a hopper for containing material to be spread and having a delivery port, a distributor pipe of synthetic resinous material having one end communicating with said delivery port and an opposite free end, and means for rapidly oscillating said distributor pipe so that said free end thereof whips back and forth in a horizontal plane to broadcast material over a swath; said free end of the distributor pipe terminating in an outlet opening and having opposite substantially upright wall portions at least one of which is provided with an additional outlet opening; and a wear-resistant layer on the inner surface of each such upright wall portion to define separate, mutually opposed wear-resistant layers.

10. In a material spreading device as defined in claim 9 including a target plate fastened to one of said wear-resistant layers and located exteriorly of said distributor pipe at said outlet opening thereof.

* * * * *